Aug. 18, 1936.  L. O. HARBAUGH  2,051,596
PLANT PROMOTING DEVICE
Filed Jan. 15, 1934
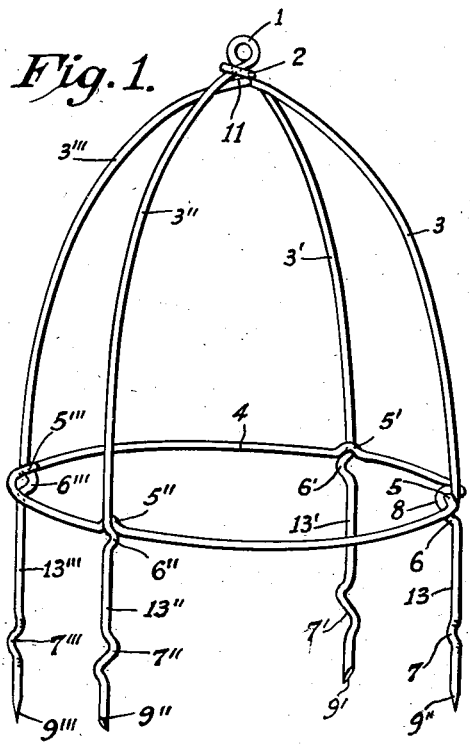
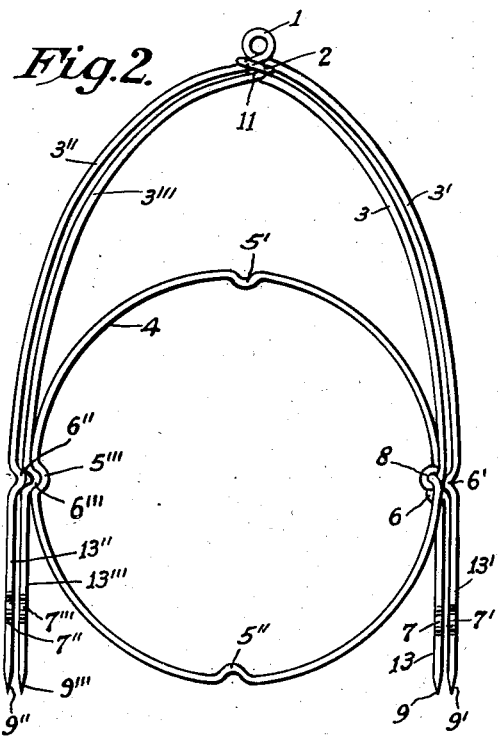
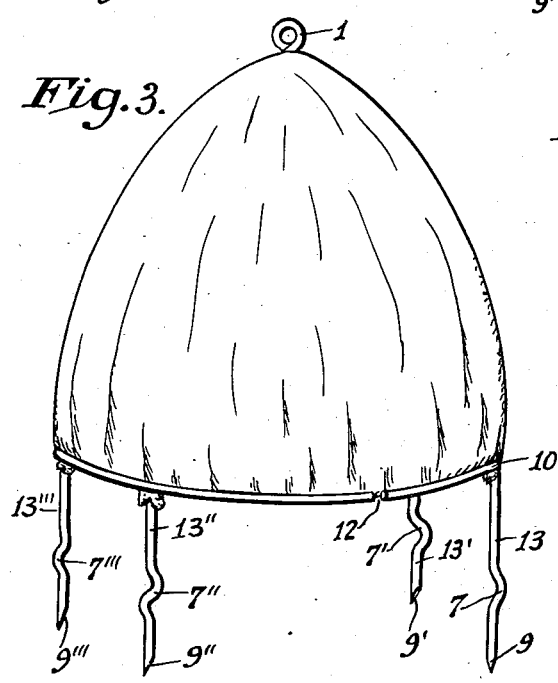
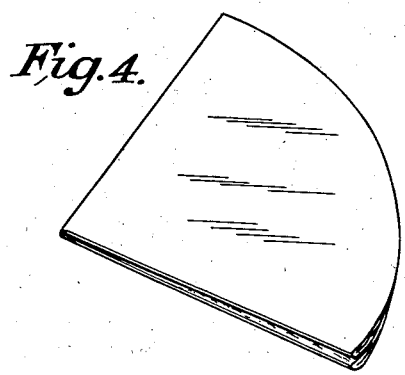
Inventor.
Losh O. Harbaugh.
BY
Attorneys.

Patented Aug. 18, 1936

2,051,596

UNITED STATES PATENT OFFICE 2,051,596

PLANT PROMOTING DEVICE

Losh O. Harbaugh, Lawrence, Ohio

Application January 15, 1934, Serial No. 706,612

14 Claims. (Cl. 47—28)

The invention relates to plant promoting devices in the form of miniature hothouses for sheltering and hastening the fructification of young plants, individually or in groups, the principal object being to provide a device of this type that is simple in construction, efficient in its use and inexpensive to manufacture.

Another object of the invention is to provide a plant promoting device that will protect the young plants from harmful acts of living creatures and also the rigorous elements of nature, and, when the plant is to be acclimated, will allow outside atmosphere to reach the plant from around the base of the device yet retain warmth in its top near the tender shoots of the plant.

Another object is to provide a device of this type that can be assembled and placed in use easily and quickly; that will remain and be rigid when in use, and when not in use be dismantled, collapsed and flattened easily and stored in a small space.

Another object is to provide a plant promoting device that will resist high winds and storms and will not be blown away nor flattened by the natural elements, yet upon occasion, when in use, can be raised and lowered, removed and replaced instantly, and maintain itself at various positions of elevation relative to the earth.

Another object is to provide a plant promoting device that may be used season after season without being rendered unfit by the cutting or tearing of the covering when the plants are to be acclimated, and that can be salvaged because of the detachability of its parts when otherwise the device would be rendered useless if a broken part could not be replaced.

The above being among the objects of the present invention, the same consists of certain novel features of construction and combination of parts to be hereinafter described with reference to the accompanying drawing and then claimed having the above and other objects in view.

In the accompanying drawing which illustrates suitable embodiments of the present invention and in which like numerals refer to like parts throughout the several views, Figure 1 is a perspective view of a hood supporting frame as constructed according to one form of the invention.

Figure 2 is a perspective view of the frame shown in Figure 1 as seen when collapsed and flattened.

Figure 3 is a perspective view of the frame shown in Figure 1 with the hood thereon.

Figure 4 is a view of the hood separated from the frame and folded and flattened.

Agriculturists always have been interested in being the first to place agricultural products upon the market to the end that they may take advantage of the higher prices obtainable for the first produce of the season. In order to accomplish this, hot beds, forcing frames and hot houses are used for starting and developing the early growth of the plants. The plants are kept sheltered throughout this forcing process until after the frost period, whereupon the plants in their advanced growth are replanted in the open to continue their maturation. This plant growth forcing process has definite limitations as to the time to be gained in hastening the early growth of plants. The seeds must be planted in the hothouses just far enough ahead that the plants will be ready, and not too crowded or too old for transplanting when the frost period ends.

In providing miniature hot houses for individual plants, the time involved in the forcing process for young plants may be lengthened by the plants being set out before the frost period ends under the protection of miniature hothouses. Or, if the agriculturist has no hothouses or other plant growth forcing means, the miniature hothouse will serve in lieu thereof, performing the same function. This latter method eliminates the replanting, since the seeds may be planted in the place where the plant is to mature and the miniature hothouse would be used there to force and protect the germination and early growth.

In promoting and hastening the early growth of plants under miniature hothouses, creatures performing acts harmful to young plants and the rigorous elements have to be contended with. The miniature hothouse must not only protect the plants from such dangers, but must be able to overcome the dangers to be able to protect the plants from them. Vulnerability of the miniature hothouse to any one of the dangers will defeat the purpose of a miniature hot house. It is apparent, then, that a device must be provided which will overcome all the elements and acts of creatures which are dangerous to the early growth of the plants.

In addition to this, to be practicable, the device must be convenient to place in use, handle, remove from use, and store. To save time for the agriculturist, who has large fields planted, the devices must be capable of being raised and lowered, removed, and replaced instantly when the plants are being cultivated. Otherwise the cost of labor and loss of time in handling the devices would be prohibitive. The devices should be capable of being collapsed and stored quickly, in large numbers in a small space, during the period they are not in use.

In furthering the general efficiency of such a device, same should be capable of acclimating the plants preparatory to its final removal without being destroyed or rendered unfit for following seasons.

To these ends and other ends this device and invention has been designed.

In its broad aspect the invention comprises a relatively concave hood provided with earth penetrative means, for securing the hood relative to the earth, and such means preferably formed and fashioned to increase its friction with the earth and be less subject to dislodgment relative to the earth. Where a frame for supporting the hood is provided, same may be made of wire, reed, strips of metal or wood, and any other pliable material. Although the frame may comprise a multiplicity of vertical supports directed and converged inwardly at their upper ends where they are terminally joined to one another at a central axis of the frame, and although three or more of these supports may be employed, yet for the purpose of simplicity and economy in production, pairs of the vertically extending supports may be formed integrally with each other in the form of an arch, and such pairs associated together at their longitudinal centers at the central axis of the frame in a fixed, pivotal or detachable relation. When the vertical supports are integrated into pairs, two or more pairs may be provided. For purposes of simple illustration, two pairs only are shown in the accompanying drawing in a preferred form.

Referring to Figure 1, two inverted U-shaped pairs of vertical supports are shown joined together in pivotal engagement at the central axis of the frame. The pair of integrated supports 3 and 3''' is perpendicularly twisted one turn at its longitudinal center into neck 11 and a circular eyelet head 1. The pair of integrated supports 3' and 3'' is horizontally looped at its longitudinal center one turn around neck 11 in the form of a collar 2. Collar 2 may be provided rigidly tight around neck 11 or pivotally loose. If collar 2 is formed pivotally loose relative to neck 11 the respective pairs of supports may be circumferentially rotated relative to each other at any angle and also to occupy the same plane, or if collar 2 is rigidly joined to neck 11, the supports 3, 3', 3'' and 3''' are positioned at their longitudinal centers at equal complementary angles relative to each other.

In the larger forms of the invention, the frame supports may be horizontally braced and spaced intermediate their extremities by a means detachably and pivotally engaged with one of two diametrically opposing supports, or both, so as to be able to rotate on its central axis from a horizontal position to a vertical plane coinciding with the plane of the engaged supports. Referring to Figure 1 for a simple illustration of this, the support spacing means is a ring 4 inwardly offset at equal circumferential distances, providing recesses 5, 5', 5'' and 5''' for engaging and spacing supports 3, 3' 3'' and 3''' respectively, just above recesses 6, 6' 6'' and 6''' which are provided, inwardly inclined, in supports 3, 3', 3'' and 3''' equidistant from the longitudinal centers of the said integrated support pairs for engaging a cover securing means to be hereinafter described. The ring 4 is held horizontally in place when in contact with the said supports above and upon the upper arms of support recesses 6, 6', 6'' and 6'''. Pivotal engagement of ring 4 relative to one of the supports, support 3, is accomplished by support 3 being loosely looped in form of loop 8 above recess 6 around ring 4 at recess 5 on ring 4, whereby ring 4 may be teetered up or down in loop 8 to a vertical plane depending upon the direction in which loop 8 is formed.

Although the earth penetrative means for securing the plant promoting device relative to the earth may be of any suitable form such as wire-like, tubular, wedge-shaped, flanged or otherwise, yet the embodiment of the invention is illustrated with wire. And although the earth penetrative means may be provided separate from the frame and adapted to engage the frame, this embodiment is illustrated by a means integral with the frame. Referring to Figure 1, the earth penetrative means is in the form of legs 13, 13', 13'' and 13''' as extensions or continuations of supports 3, 3', 3'' and 3''' respectively, below recesses 6, 6', 6'' and 6''' in said supports, so that any downward force exerted on the upper ends of said supports would be transmitted directly to the legs.

For the purpose of increasing the friction between the earth and the earth penetrative means, so that the latter will offer greater resistance to being dislodged relative to the former, the earth penetrative means may be provided with means adapted to accomplish this purpose. Such a means for increasing dislodgment resistance relative to the earth, may be a separate attachment such as a disc, knob, nodule or other irregular form on the earth penetrative means, or the earth penetrative means itself may be fashioned, formed, irregularly bent or deformed to irregularly displace the earth when thrust into the earth. A simple illustration of this embodiment is shown in the accompanying drawing wherein the legs 13, 13', 13'' and 13''' are laterally offset to form wave-like irregularities 7, 7', 7'' and 7''' respectively, which obviously offer greater resistance to being moved relative to the earth once they engage the earth. The degree of resistance may be varied by the angle of the offset. The means for increasing the friction between the earth and the earth penetrative means of the invention will also serve the purpose to hold and secure the device at various positions of elevation relative to the earth, depending upon the depth to which the earth penetrative means and the increasing friction means are placed in the earth. To facilitate insertion into the earth, the lower extremities of the earth penetrative means may be sharpened or narrowed, or obliquely-cut crosswise as shown by 9, 9', 9'' and 9'''.

The covering for the frame may be made out of any adaptable, preferably translucent, material such as paper, cloth, "Cellophane", comparatively thin rubber or other similar substances of a weather-resisting nature, and may be in the form of a flat disc, tubular, bag-like, or otherwise of a form adaptable to fit a concave frame. And although such covering material may be formed and fashioned separately to fit the frame, the particular embodiment of the invention illustrated in Figures 3 and 4 is a circular disc for fitting over the frame itself.

The covering when applied to the frame is securely closed around neck 11 above collar 2 in manner suitable to keep out insects and natural elements, and at its marginal edges is secured to the frame at the horizontally inclined support-bracing means, ring 4. Several ways may be employed to secure the covering to the frame at ring 4. Clips may be used, fitting over ring 4 and adapted to secure the covering relative thereto, or a resilient ring means may be provided. Such a ring means would be biased to expand if employed to fit within the concavity of the frame where it would hold the marginal edges of the covering upon inside of said concavity, or such ring means could be biased to contract as illustrated by band 10 in the drawing. Band 10 slips down over the covering and the outside of the frame along the vertical supports 3, 3', 3'' and 3''' until it reaches recesses, 6, 6', 6'' and 6''' in said supports, respectively, when, because of its resilient capacity for contraction, it draws or springs into said recesses, drawing the lower and marginal edges of the covering in, under and snugly against ring 4, the covering being secured thereby between band 10 and ring 4.

To use the device when assembled as shown in Figures 1 and 3, place same over the plant or place where seed is planted, and push the legs 13, 13', 13'' and 13''' far down into the earth until ring 4 and band 10 are imbedded in the loose earth. This isolates a region surrounding the plant from the outside atmosphere, permits the beneficial rays of the sun to reach the isolated region and protects said region from influences harmful to the sheltered plant.

While the plants are being cultivated, use the circular head 1 to lift the device from over the plant. After the cultivation of the plant is accomplished the device is replaced as above described. When the plants have reached sufficient maturity to be exposed to the outside atmosphere, the exposure may be done gradually. By using head 1 to raise the device a short distance above the earth, circulation of fresh outside atmosphere is effected between the lower edge of the covering and the earth, while the warmth is retained in the top of the device nearest to the tender shoots. Various positions of elevation of the device relative to the earth enables a gradually increasing acclimation of the plants to the outside atmosphere preparatory to the final removal of the device. The earth friction increasing means as illustrated by the leg formation 7, 7', 7'' and 7''' will determine and retain the device at its various positions of elevation relative to the earth.

To collapse the illustrated device for storage purposes after the same is finally removed from over the plants, remove band 10 from its engagement with the frame, and by means of opening 12 in band 10, pass band 10 through head 1. Push ring 4 up and off the upper arms of recesses 6', 6'' and 6''' and then rotate ring 4 in loop 8 by pushing the side of ring 4 at recess 5' or 5'' up or down as permitted by the direction in which loop 8 is formed until ring 4 occupies the plane of supports 3 and 3'''. Next rotate collar 2 around neck 11 until supports 3' and 3'' are parallel with supports 3 and 3'''. Fold the covering over and flatten it against supports 3, 3', 3'' and 3''' if not removed from the frame over head 1 and folded as shown in Figure 4. Then pass head 1 over a wire or rod until the device is needed for another season, at which time the above process will be reversed.

It is obvious that the specific construction is capable of various modifications and changes, and accordingly, formal changes may be made in the specific embodiment of the invention shown without departing from the substance or spirit of the broad invention, the scope of which is commensurate with the appended claims.

I claim:—

1. A plant promoting device comprising a hood member for covering plants and isolating a region surrounding the plants from outside atmosphere, earth penetrative means for securing the hood member relative to the earth, and earth penetration resisting means for retaining said hood member at various positions of elevation relative to the earth.

2. A plant promoting device comprising a hood member for covering plants and isolating a region surrounding the plants from outside atmosphere, earth penetrative means for securing the hood member relative to the earth, and means integral with the earth securing means, adapted to retain said hood member at various positions of elevation relative to the earth.

3. A plant promoting device comprising a hood supporting frame for covering plants, means for securing the frame relative to the earth, means adapted to retain said frame at various positions of elevation relative to the earth, a weather resisting covering on the frame for isolating a region around the plants from outside atmosphere.

4. A plant promoting device comprising a hood supporting frame for covering plants, earth penetrative means for securing the frame relative to the earth, and earth penetration resisting means for retaining said frame at various positions of elevation relative to the earth, a covering on said frame for isolating a region around the plants from outside atmosphere.

5. A plant promoting device comprising a hood supporting frame for covering plants, earth penetrative means provided with means adjacent lower extremity thereof adapted to displace earth and resist removal of earth penetrative means relative to the earth.

6. In a miniature hot house, earth penetrative means provided with laterally offset portions adapted to secure the device against dislodgement and retain same at various positions of elevation relative to the earth.

7. In a plant promoting device, a hood supporting frame comprising a multiplicity of vertical supports directed inwardly at their upper ends and pivotally jointed at their intersecting portions, and an integral projection on one of said supports at said joint providing a handle for said device.

8. In a plant promoting device, a hood supporting frame comprising supports pivotally joined at their apexes, and releasable means engaging said supports and adapted to retain same in a spaced relation.

9. In a plant promoting device, a hood supporting frame comprising supports pivotally joined at their upper extremities and provided at their lower ends with earth penetrative and earth penetration resisting means adapted to secure said frame relative to the earth and at various positions of elevation to the earth.

10. In a plant promoting device, a hood, a hood supporting frame comprising supports pivotally joined at their upper ends and having laterally offset portions intermediate their ends providing seats and abutments, an annular means engaging said seats for retaining the supports in a spaced relation, and annular means positioned against said abutments for retaining the hood relative to the frame.

11. In a plant promoting device, a hood supporting frame comprising supporting members joined at their upper ends and having laterally offset portions intermediate their ends, annular means engaging said offset portions for securing said supports in spaced relation, and other annular means also engaging said offset portions and co-acting with said annular spacing means for securing a cover on said device.

12. In a plant promoting device, a hood supporting frame comprising supporting members pivotally associated at their upper ends about one of their number formed to provide a handle, said members being offset intermediate the pivot and their lower extremities, a means operatively engaging said support at the offsets for spacing said support, a hood for said frame, and means cooperating with said support-spacing means for securing the lower edges of said hood thereto.

13. A plant promoting device comprising interengaged hood supporting frame members spaced for covering plants, a cover on said frame members isolating a region surrounding the plants from outside atmosphere, means for securing said cover on the frame members, earth penetrative means securing the frame relative to the earth, said penetrative means being laterally offset adjacent the lower extremities in manner displacing earth when the penetrative means is moved vertically for retaining the frame at various positions of elevation to the earth.

14. A plant promoting device comprising a hood member for covering plants and isolating a region surrounding the plants from outside atmosphere, earth penetrative means for securing the hood member relative to the earth, and earth dislodging, penetration resisting means for retaining said hood member at various positions of elevation relative to the earth without the penetrative means being withdrawn from the earth when changing a position of elevation.

LOSH O. HARBAUGH.